United States Patent [19]

Swigert

[11] 3,929,858

[45] Dec. 30, 1975

[54] METHOD FOR PREPARING 2-BROMO-2-BROMOMETHYL-GLUTARONITRILE

[75] Inventor: Roger D. Swigert, Rahway, N.J.

[73] Assignee: Merck & Co., Inc., Rahway, N.J.

[22] Filed: Dec. 3, 1974

[21] Appl. No.: 529,014

[52] U.S. Cl. .................. 260/465.7; 260/465.8 D X
[51] Int. Cl.² ............... C07C 120/00; C07C 121/20
[58] Field of Search ................................. 260/465.7

[56] References Cited
UNITED STATES PATENTS

| | | | |
|---|---|---|---|
| 3,644,380 | 2/1972 | Harmetz et al. ......... | 260/465.8 D X |
| 3,833,731 | 9/1974 | Grier et al. ................. | 260/465.7 X |
| 3,849,422 | 11/1974 | Weis ........................... | 260/465.7 X |

OTHER PUBLICATIONS

Groggins, *Unit Processes in Organic Synthesis*, 1958, pp. 258–259.

*Primary Examiner*—Joseph P. Brust
*Attorney, Agent, or Firm*—Edmunde D. Riedl; J. Jerome Behan

[57] ABSTRACT

An accelerated reaction for preparing 2-bromo-2-bromomethylglutaronitrile from bromine and 2-methyleneglutaronitrile by heating from 70°C. to 110°C. in a reaction medium comprising water or carbon tetrachloride.

4 Claims, No Drawings

METHOD FOR PREPARING 2-BROMO-2-BROMOMETHYL-GLUTARONITRILE

This invention relates to a new and improved method for preparing 2-bromo-2-bromomethylglutaronitrile. More particularly, it relates to a method of preparing 2-bromo-2-bromomethylglutaronitrile by reacting bromine with 2-methyleneglutaronitrile in a reaction medium consisting of carbon tetrachloride or water at an elevated temperature.

2-Bromo-2-bromomethylglutaronitrile is an active antibacterial and antifungal agent, as disclosed in U.S. Pat. No. 3,833,731, Grier et al. Its preparation is described in that patent as well as in U.S. Pat. No. 3,644,380. In the disclosure of each of these patents, it is taught that the reaction is carried out at temperatures preferably below about 30°C. and that a solvent either is unnecessary or is not preferred, and the reaction is extended over a period of from 8–72 hours.

When the time required to produce a batch of 2-bromo-2-bromomethylglutaronitrile extends beyond a single work turn or shift, production costs attributable to labor increase beyond the production cost attainable if the batch could be produced in a single shift. Likewise, such extended periods required for production engage capital equipment which result in a decrease in productive capacity not only for 2-bromo-2-bromomethylglutaronitrile, but also for all other chemicals that could have been produced in the engaged equipment. Thus, a primary goal in production processes generally and in the production of 2-bromo-2-bromomethylglutaronitrile in particular is to decrease the required reaction time.

Contrary to prior art teachings, I find that an extended reaction time is not required if a hereinafter specified reaction medium and elevated temperatures are employed. The reaction can be accomplished very efficiently and effectively in a shortened reaction time of from ¼ hour to 4 hours by reaction of bromine and 2-methyleneglutaronitrile in either an aqueous or a carbon tetrachloride reaction medium, at a temperature in excess of 70°C.

In the process of this invention, bromine and 2-methyleneglutaronitrile are admixed in a reaction medium comprising water or carbon tetrachloride.

Although the sequence of addition is not material to and has no effect upon the end result, I prefer to dissolve or disperse the 2-methyleneglutaronitrile in carbon tetrachloride or water, heat to reflux and then introduce the bromine below the surface of the refluxing reaction mixture. This method of introduction of the bromine lessens or obviates the vaporization of the bromine which can present hazards to chemical operators.

The use of an equimolar quantity of 2-methyleneglutaronitrile and bromine is preferred, but an excess of either reactant results only in excess unreacted reactant. However, it is suitable to employ a slight excess, e.g., 1 to 2 molar percent of bromine, to ensure complete reaction of the relatively more expensive 2-methyleneglutaronitrile.

When the reaction medium comprises water, the quantity employed is from about 0.75 to 1.5 parts by weight of water for each part by weight 2-methyleneglutaronitrile which is sufficient to achieve a good dispersion. The preferred ratio is 1.2 parts water for each part of 2-methyleneglutaronitrile. Similar quantities of carbon tetrachloride are employed when it comprises the reaction medium, although generally slightly less can be used since the 2-methyleneglutaronitrile is more soluble therein. Suitable amounts of carbon tetrachloride are 0.5 to 1.5 parts of carbon tetrachloride for each part of 2-methyleneglutaronitrile. The use of additional carbon tetrachloride is not deleterious, but does increase the required heat input, and purification problems and is therefore not desirable.

The reaction is generally and preferably conducted at the reflux temperature of the reaction medium although a temperature range of 70°C. to 110°C. is satisfactory. If the reaction is conducted in excess of the reflux temperature it is necessary to conduct the reaction in a pressure vessel. Generally, however, reaction temperatures in excess of 110°C. are not desirable or necessary since at lower temperatures the reaction is substantially quantitative and rapid.

The following examples are illustrative of the invention, but should not be construed as limiting either on the foregoing disclosure of the appended claims.

EXAMPLE 1

The reaction is carried out in 1000 ml. round bottomed glass flask equipped with motor-driven paddle stirrer, water-cooled reflux condenser and a bromine addition tube extending beneath the surface of the stirring reaction. The flask is charged with 213 g. of 97% α-methyleneglutaronitrile and 250 ml. of water. The immiscible mixture is then agitated and heated to reflux. Then, 311 g. of bromine is added to the refluxing stirring reaction mixture over a period of 2.5 hours. No observable temperature variations are noticed either in the liquid phase or vapor space on addition of bromine regardless of the rate of addition. The reaction is continued with stirring under reflux for one hour after addition of the bromine is complete. A very fine dispersion of the two phases is noticed throughout the course of the reaction assuring good heat transfer. Upon cooling the two phases rapidly clarify and separate as soon as the stirring is discontinued. The upper aqueous layer is colorless and strongly acidic. On prolonged standing at room temperature, the product layer solidifies into an off-white crystalline mass melting at 48°C. to 52°C. The upper aqueous layer is decanted and, after drying, the weight of the lower layer was 518 g. (99.9% of theory). This material is recrystallized from 500 ml. of methanol to give 506 g. (97.6%) of white crystals melting at 51°C. to 53°C. It is noticed that the heavy product layer remains fluid for some time and can be pumped and transferred while in a liquid state.

EXAMPLE 2

The above example is repeated employing carbon tetrachloride in place of the water.

What is claimed is:

1. A method for preparing 2-bromo-2-bromomethylglutaronitrile comprising reacting substantially equimolar quantities of bromine and 2-methyleneglutaronitrile in a solvent selected from the group consisting of water or carbon tetrachloride wherein there is 0.75 to 1.5 parts by weight of water or 0.5 to 1.5 parts by weight carbon tetrachloride employed for each part by weight of 2-methyleneglutaronitrile at a temperature of from about 70°C. to about 110°C. for from about ¼ hour to 4 hours.

2. A method according to claim 1 wherein the reaction medium is water.

3. A method according to claim 1 wherein the reaction is conducted under reflux.

4. A method according to claim 1 wherein the reaction medium is carbon tetrachloride.

* * * * *